US011965904B2

(12) United States Patent
Zhao et al.

(10) Patent No.: US 11,965,904 B2
(45) Date of Patent: Apr. 23, 2024

(54) METHOD FOR MEASURING DENSITIES BASED ON CIRCULAR MAGNETIC LEVITATION

(71) Applicant: Zhejiang University, Zhejiang (CN)

(72) Inventors: Peng Zhao, Zhejiang (CN); Chengqian Zhang, Zhejiang (CN); Fu Gu, Zhejiang (CN); Xuechun Zhang, Zhejiang (CN); Jun Xie, Zhejiang (CN); Jianzhong Fu, Zhejiang (CN)

(73) Assignee: Zhejiang University, Hangzhou (CN)

( * ) Notice: Subject to any disclaimer, the term of this patent is extended or adjusted under 35 U.S.C. 154(b) by 586 days.

(21) Appl. No.: 17/147,721

(22) Filed: Jan. 13, 2021

(65) Prior Publication Data

US 2021/0215589 A1 Jul. 15, 2021

(30) Foreign Application Priority Data

Jan. 15, 2020 (CN) .......................... 202010041028.5

(51) Int. Cl.
*G01N 9/08* (2006.01)
(52) U.S. Cl.
CPC ...................................... *G01N 9/08* (2013.01)
(58) Field of Classification Search
CPC .............. G01N 9/08; G01N 9/18; G01N 9/12
See application file for complete search history.

(56) References Cited

U.S. PATENT DOCUMENTS

| 2010/0285606 A1* | 11/2010 | Phillips | G01N 33/54333 436/526 |
| 2013/0133419 A1* | 5/2013 | Whitesides | G01N 9/10 73/32 R |
| 2013/0314080 A1* | 11/2013 | Whitesides | G01R 33/1269 324/232 |

(Continued)

FOREIGN PATENT DOCUMENTS

| CN | 202649073 U | 1/2013 |
| CN | 106568677 A | 4/2017 |

(Continued)

OTHER PUBLICATIONS

Shencheng Ge and George M. Whitesides; Axial Magnetic Levitation Using Ring Magnets Enables Simple Density-Based Analysis, Separation, and Manipulation, Oct. 1, 2018; American Chemical Society (Year: 2018).*

*Primary Examiner* — Manuel A Rivera Vargas (57) ABSTRACT

A sample to be measured is placed in a medium solution between two circular magnets to ensure that the sample to be measured is levitated in a set circular area between the two circular magnets, and a levitation position of the sample to be measured in the magnetic field is measured. The density of the sample is calculated according to formula (I):

$$\rho_s = \rho_m + \frac{\chi_m - \chi_s}{g\mu_0}\left(B_r\frac{\partial B_z}{\partial r} + B_z\frac{\partial B_z}{\partial z}\right).$$

(Continued)

Compared to the prior art, the method of the present disclosure provides a novel method for measuring a density of a substance, in which the involved device is easy to operate and has low cost, and the measurement results are easy to observe and have high accuracy.

9 Claims, 4 Drawing Sheets
(1 of 4 Drawing Sheet(s) Filed in Color)

(56) References Cited

U.S. PATENT DOCUMENTS

| | | | |
|---|---|---|---|
| 2014/0123461 A1* | 5/2014 | Whitesids | C30B 30/04 29/428 |
| 2019/0293639 A1 | 9/2019 | Ghiran et al. | |
| 2022/0152628 A1* | 5/2022 | Abrahamsson | B03C 1/0335 |

FOREIGN PATENT DOCUMENTS

| | | |
|---|---|---|
| CN | 106568680 A | 4/2017 |
| CN | 108872007 A | 11/2018 |
| CN | 110376274 A | 10/2019 |

* cited by examiner

METHOD FOR MEASURING DENSITIES BASED ON CIRCULAR MAGNETIC LEVITATION

CROSS-REFERENCE TO RELATED APPLICATIONS

This application claims the benefit of priority from Chinese Patent Application No. 202010041028.5, filed on Jan. 15, 2020. The content of the aforementioned application, including any intervening amendments thereto, is incorporated herein by reference in its entirety.

TECHNICAL FIELD

The present application relates to measurement technologies, and more particularly to a method for measuring a density based on circular magnetic levitation.

BACKGROUND

Density is one of the basic physical characteristics of substances, and different substances generally have different densities. At the same time, different internal microstructures and material composition will also be reflected in the changes in density at a macro level. Therefore, it is of great significance to measure densities in scientific research, production process and daily life.

Density is defined as the mass of substance in per unit volume. The buoyancy principle discovered by Archimedes 2200 years ago is a basic principle of most existing density measurement, and different density measurement methods are all based on a basic calculation formula of density: ρ=m/V.

Common measurement methods include a buoyancy method, a pycnometer method, a densimeter method and a density gradient method. The buoyancy method is mainly adopted to measure densities of solids or immiscible liquids. The pycnometer method can measure the density of solids and liquids more accurately. The densimeter method is mainly adopted to measure the density of liquids. The density gradient method can be used to measure the densities of small samples by constructing an appropriate density gradient through two liquids which are miscible and have different densities.

These measurement methods are mainly based on Archimedes' principle and relatively simple. However, it is difficult or expensive to obtain higher measurement accuracy. Specifically, the accuracy of the buoyancy method and the pycnometer method depends on the measurement accuracy of qualities, and the accuracy of the densimeter method depends on the manufacturing accuracy of density meters. Therefore, the buoyancy method, the pycnometer method and the densimeter method require high-precision and expensive equipment to obtain more accurate results. The density gradient method has a large measurement error due to the limitation of the manufacturing method of the density gradient.

Magnetism is also one of the basic physical characteristics of substances, and any substance will be magnetized in a magnetic field. Substances can be divided into paramagnetic substances and diamagnetic substances according to directions of additional magnetic fields generated by magnetization. The additional magnetic field of the paramagnetic substances is in the same direction as the excitation magnetic field, and the additional magnetic field of the diamagnetic substances and the excitation magnetic field have opposite directions. The magneto-Archimedes levitation is proposed by combining the magnetism of the substance and the Archimedes' principle, which simplifies the levitation conditions of objects in the magnetic field. Therefore, the magneto-Archimedes levitation can be more widely applied.

It is difficult to achieve high-accuracy density measurement based on the Archimedes' principle and its derivative methods. Expensive measurement equipment is needed to achieve high-precision measurement by using the existing density measurement methods. Moreover, the Archimedes' principle-based measurement methods are usually not sensitive to small-sized samples, thus cause large measurement errors. On the other hand, other density measurement methods generally involve new technologies, where the measurement devices are expensive, the operation and calculation methods are complicated. Therefore, the application of density measurement for small-sized samples is relatively limited.

Chinese Patent Publication No. 108872007 A disclosed a method for measuring a density based on two circular magnets, which realizes excellent density measurement for the sample. However, the measurement accuracy of this method is not optimal. Especially, when the distance between the two magnets is gradually increased, the measurement accuracy of the method will gradually decrease, and the applicability will be reduced.

SUMMARY

In order to solve technical defects of the existing density measurement methods, the present disclosure proposes a method for measuring densities based on circular magnetic levitation, which has the advantages of low cost, high precision, and being easy to operate.

The present disclosure provides a method for measuring a density based on circular magnetic levitation, comprising:
placing a sample to be measured in a medium solution between two circular magnets to ensure that the sample to be measured is levitated in a set circular area between the two circular magnets;
measuring a levitation position of the sample to be measured in a magnetic field; and
calculating the density of the sample to be measured according to formula (I)

$$\rho_s = \rho_m - \frac{\chi_m - \chi_s}{g\mu_0}\left(B_r\frac{\partial B_z}{\partial r} + B_z\frac{\partial B_z}{\partial z}\right); \quad (I)$$

wherein $\rho_s$ is the density of the sample to be measured, g/cm³; $\rho_m$ is a density of the medium solution, g/cm³; $\chi_s$ is a magnetic susceptibility of the sample to be measured, dimensionless; $\chi_m$ is a magnetic susceptibility of the medium solution, dimensionless; g is a gravitational acceleration, m/s²; $\mu_0$ is a vacuum permeability, N/A²; $B_r$, $B_z$ are respectively a radial magnetic field intensity and an axial magnetic field intensity at the levitation position; r,z are respectively a levitation radius (a distance from a center line of the two circular magnets to the sample to be measured) and a levitation height (a distance from an upper surface of a lower magnet to the sample to be measured) of the sample to be measured in the medium solution, mm.

In an embodiment, the two circular magnets have the same specification (i.e., same size) and are arranged coaxially up and down; and like poles of the two circular magnets face each other (e.g., negative poles of the two circular magnets face each other, or positive poles of the two circular magnets face each other); and the medium solution is arranged between the two circular magnets.

Specifically, the method for measuring the density based on circular magnetic levitation, comprising:
(1) determining the medium solution according to the material of the sample to be measured to ensure that the sample to be measured can be levitated in the medium solution, wherein the medium solution is a paramagnetic medium solution;
(2) placing the sample to be measured into the medium solution;
(3) placing the medium solution in a magnetic levitation measurement device equipped with the two circular magnets; wherein the two circular magnets have a same size and are arranged coaxially up and down; like poles of the two circular magnets face each other; and the two circular magnets are separated by a certain distance, to ensure that the sample to be measured can be circularly levitated, i.e., the sample to be measured is ensured to be levitated in the set circular area between the two circular magnets;
(4) measuring a levitation position (a levitation radius and a levitation height) of the sample to be measured; and
(5) calculating the density of the sample to be measured according to the formula (I).

Before measuring the density of the sample, the distance between the two circular magnets needs to be calculated, to ensure that the sample to be measured can be circularly levitated in the medium solution.

In some embodiments, after obtaining sizes (an inner radius r1, an outer radius r2 and a height h) and a magnetic field intensity of the two circular magnets, values of an expression $$B_r \frac{\partial B_r}{\partial r} + B_z \frac{\partial B_r}{\partial z}$$

between the two circular magnets with different distances (distance d=h~3h) are firstly calculated; if a curve expressed by a formula $$B_r \frac{\partial B_r}{\partial r} + B_z \frac{\partial B_r}{\partial z} = 0$$

is outside the center line, and a gradient of the curve expressed by the expression $$B_r \frac{\partial B_r}{\partial r} + B_z \frac{\partial B_r}{\partial z}$$

in r direction is greater than 0, it is indicated that such distance enables circular levitation to be achieved when measuring the sample, so as to determine a distance interval of the two circular magnets of the device within which the circular levitation can be achieved.

Therefore, the distance between the two circular magnets satisfies:
(1) the curve expressed by the formula $$B_r \frac{\partial B_r}{\partial r} + B_z \frac{\partial B_r}{\partial z} = 0$$

does not completely coincide with the center line of the two circular magnets; and
(2) the gradient of the curve expressed by the expression $$B_r \frac{\partial B_r}{\partial r} + B_z \frac{\partial B_r}{\partial z}$$

in r direction is greater than 0.

In some embodiments, an outer radius of each of the two circular magnets is 20-40 mm; an inner radius of each of the two circular magnets is 10-30 mm; a height of each of the two circular magnets is 10-30 mm; a magnetic induction intensity of the two circular magnets is 0.08-0.2 T; and a distance between the two circular magnets is 30-50 mm. In some embodiments, the outer radius of each of the two circular magnets is 30 mm; the inner radius of each of the two circular magnets is 20 mm; the height of each of the two circular magnets is 20 mm; the magnetic induction intensity of the two circular magnets is 0.125 T; and the distance between the two circular magnets is 30-50 mm.

In some embodiments, the medium solution is a paramagnetic medium solution, for example, the medium solution is a paramagnetic medium aqueous solution or a paramagnetic medium alcoholic solution. In some embodiments, the paramagnetic medium solution is a solution of manganese salt, iron salt or gadolinium salt, for example, the paramagnetic medium solution is a solution of $MnCl_2$, $FeCl_3$, $GdCl_3$, or Gd-DTPA.

In some embodiments, the medium solution is an aqueous solution of $MnCl_2$ or a solution of $MnCl_2$ in alcohol, for example, it can be a solution of $MnCl_2$ in methanol, a solution of $MnCl_2$ in ethanol or a solution of $MnCl_2$ in isopropanol. In some embodiments, the medium solution is a 0.5-5 mol/L aqueous solution of $MnCl_2$ or a 0.5-5 mol/L alcohol solution of $MnCl_2$. In some embodiments, the medium solution is a 2-2.5 mol/L aqueous solution of $MnCl_2$ or a 0.8-1.5 mol/L solution of $MnCl_2$ in alcohol. In some embodiments, the density of the sample to be measured is 0.8-1.5 g/cm³, to further guarantee the measurement accuracy.

In some embodiments, when preparing the medium solution, the density of the medium solution is controlled to ensure that the sample to be measured is levitated in the medium solution.

In some embodiments, when preparing the medium solution, the density of the medium solution is slightly greater than or slightly less than the density of the sample to be measured, to ensure that the sample to be measured can be stably levitated in the medium solution, so as to further improve the measurement accuracy.

Before preparing the medium solution, the density and the magnetic susceptibility of the medium solution is calibrated in advance to obtain the relationship of the density and the magnetic susceptibility of the medium solution. For a specific medium solution, a standard curve of the density and the magnetic susceptibility can be determined through the calibration. In practical use, the density of the medium solution can be obtained by directly measuring the magnetic susceptibility of the medium solution, so that the medium solution with an appropriate density can be selected, which further facilitates the selection of the medium solution.

In some embodiments, a maximum size of the sample to be measured is not more than 7 mm. The method of the present disclosure is especially suitable for the density measurement of samples with small size due to high measurement accuracy.

In some embodiments, the sample to be measured is centrosymmetric. For example, the sample is a spherical sample, an ellipsoidal sample, an oblate spherical sample, a disc-shaped sample, a cylindrical sample, a biconical sample, a cube-shaped sample, a rectangular parallelepiped sample with a square cross section.

In some embodiments, the sample to be measured is spherical.

A principle of the method of the present disclosure is described as follows.

According to the magnetic charge model, a cylindrical coordinate system with a center of one of the circular magnets as a coordinate origin is established, wherein an outer radius of the circular magnet is $r_2$; an inner radius of the circular magnet is $r_1$; a height of the circular magnet is h; and a direction of the height h is the z axis (for example, the coordinate origin is a center of a top surface of the lower circular magnet, and a vertical upward direction is a positive direction of the z axis). A radial magnetic induction intensity and an axial magnetic induction intensity at a point (r, z) respectively are as follows.

I: The radial magnetic induction intensity $B_r(r,z)$ is:

$$B_r(r,z)=(B_r^{r_1,h}-B_r^{r_2,h})-(B_r^{r_1,0}-B_r^{r_2,0});$$

wherein r is a distance between the point and the center line of the two circular magnets (i.e., the z axis);

$$B_r^{R,H} = \frac{\sigma \cdot R}{2\sqrt{r^2+R^2+(z+h-H)^2}} \times \sum_{i=0}^{\infty}\left[\begin{array}{c}\frac{1}{2}\\2i+1\end{array}\right](k_{R,H}^2)^{2i+1}\frac{(2i+2)!}{[2^{i+1}(i+1)!]^2};$$

$$\text{wherein:}\left[\begin{array}{c}n_1\\i\end{array}\right] = \frac{n_1(n_1+1)\ldots\ldots(n_1+i-1)}{i!};$$

$$k_{R,H}^2 = \frac{2rR}{r^2+R^2+(z+h-H)^2};$$

wherein R is selected from $r_2$ and $r_1$; H is selected from h and 0; z is a height of the sample to be measured from the top surface of the lower magnet when levitating in the medium solution, mm; $r_1$ is the inner radius of the circular magnet; $r_2$ is the outer radius of the circular magnet; h is the height of the circular magnet, mm; and $\sigma$ is a surface magnetic pole density, T.

II: the axial magnetic induction intensity $B_z(r,z)$ is:

$$B_z(r,z)=B_{z1}(r,z)-B_{z1}(r,2h+d-z);$$

$$B_{z1}(r,z)=B_z^h-B_z^0;$$

wherein, $$B_z^H = \frac{\sigma}{4\pi(z+h-H)} \times \sum_{n}^{2}(-1)^{n-1}$$

$$\frac{k_{n,H}}{\sqrt{r \cdot r_n}}[(D-r)(D-r_n)\prod(h_{1,H},k_{n,H})+(D-r)(D;-r_n)\prod(h_{2,H},k_{n,H})]$$

$$h_{,H} = \frac{2r}{r+(-1)^{n-1}\sqrt{r^2+(z+h-H)^2}};$$

$$k_{n,H} = \sqrt{\frac{4rr_n}{(r+r_n)^2+(z+h-H)^2}};$$

$$D = \sqrt{r^2+(z+h-H)^2};$$

the equation z=2h+d−z is substituted to the above formulas, and values of $B_{2h+d-z}^h$ and $B_{2h+d-z}^0$ are obtained, respectively;

wherein His selected from hand 0; $r_n(n=1, 2)$ are the inner radius and outer radius of the circular magnets; $\Pi^{(n,k)}$ is a third kind of complete elliptic integral.

According to simulation results of the magnetic field, in the middle area of the two circular magnets, except for the center line, $(\vec{B}\cdot\vec{\nabla})\vec{B}$ in most of the area diverges outward along a direction of the center line in the circumferential plane component. According to the calculation result, if the distance between the two circular magnets is kept within a certain interval, the sample to be measured can be stably levitated in a non-centerline part of the middle area of the magnets.

According to an optimization of the distance between the two circular magnets and a simulation result of the magnetic field, combined with the actual application, the sample to be measured in the medium solution will be pushed to a stable position outside the center line, and due to the symmetry of the device, the stable position of the sample is a ring around the centerline. Based on the Archimedes' principle, a final equilibrium equation of the sample to be measured is:

$$\frac{\chi_s-\chi_m}{\mu_0}V\left(B_r\frac{\partial B_z}{\partial r}+B_z\frac{\partial B_z}{\partial z}\right)+(\rho_s-\rho_m)V\cdot g = 0;$$

wherein V is a volume of the sample to be measured;

the final equilibrium equation is simplified to a corresponding relationship (I) between the density and the levitation position of the sample:

$$\rho_s = \rho_m + \frac{\chi_m-\chi_s}{g\mu_0}\left(B_r\frac{\partial B_z}{\partial r}+B_z\frac{\partial B_z}{\partial z}\right).$$

Due to the symmetry of the magnetic field, the samples to be measured with different densities have different levitation heights, and the samples to be measured in the same levitation height have a same levitation radius. Therefore, the levitation position of the sample to be measured can be calculated by measuring the levitation height of the sample to be measured in the paramagnetic medium solution, thereby calculating the density of the sample.

In the above-mentioned measurement method, the density of a product is estimated based on the material of the product, and a corresponding medium solution should be prepared before measuring. In addition, a Gouy's method can be adopted to measure the magnetic susceptibility of the medium solution accurately.

Compared to the prior, the present invention has the following beneficial effects.

The present invention provides a novel method for measuring densities of substances, in which the involved device is easy to operate and has low cost, and the measurement results are easy to observe and have high accuracy.

BRIEF DESCRIPTION OF THE DRAWINGS

The patent or application file contains FIG. 4 executed in color. Copies of this patent or patent application publication with color drawing(s) will be provided by the Office upon request and payment of the necessary fee.

DETAILED DESCRIPTION OF EMBODIMENTS

The present disclosure will be further described in detail in conjunction with specific embodiments and the accompanying drawings, from which the present disclosure will be more clearly understood.

Figure 1:
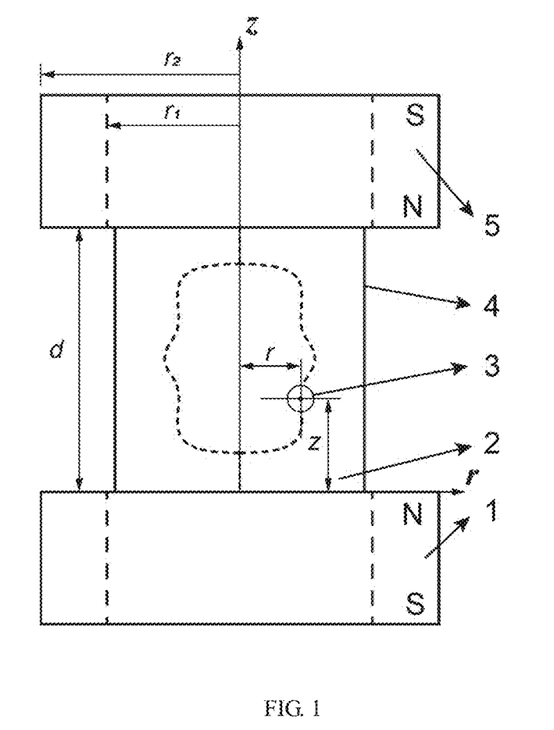
FIG. 1 is a schematic diagram of a magnetic levitation device according to an embodiment of the present disclosure, in which a sample is placed in a medium solution to measure the density of the sample.
Figure 4:
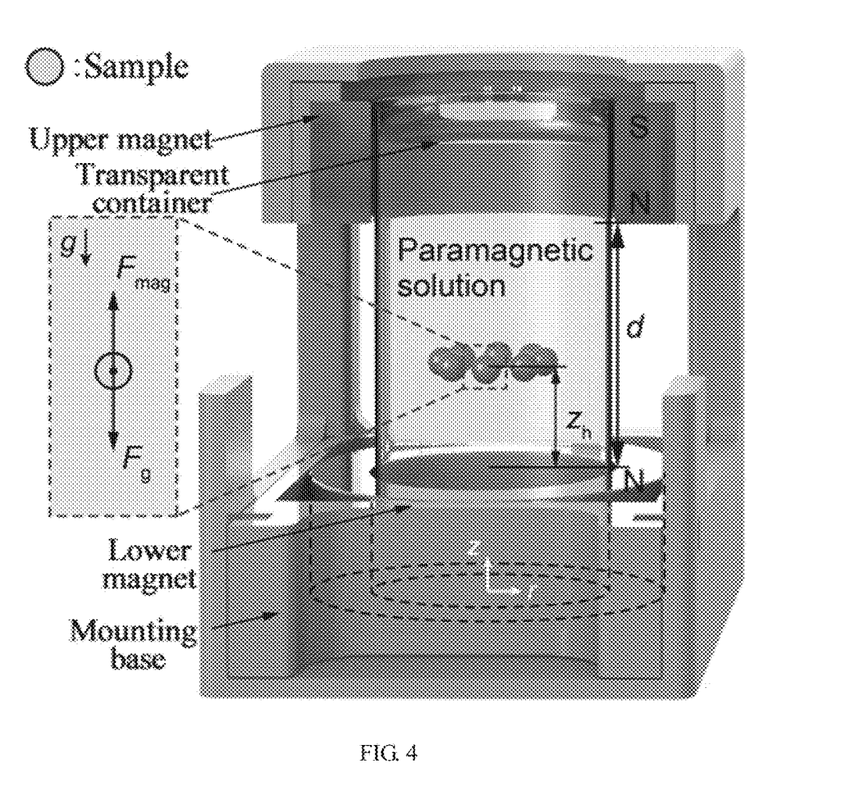
FIG. 4 is a structural diagram of the magnetic levitation device according to an embodiment of the present disclosure.

FIG. 1 is a schematic diagram of a magnetic levitation device of the present disclosure; and FIG. 4 is a structural diagram of the magnetic levitation device of the present disclosure. Illustrated is a magnetic levitation device, including a lower magnet 1, an upper magnet 5, a medium solution 2, a sample to be measured 3 and a container 4 (transparent container). The container is required to be transparent to measure a height of the sample therein easily. A levitation position of the sample to be measured 3 is (r,z). The container 4 is arranged between the lower magnet 1 and the upper magnet 5, and the container 4, the lower magnet 1 and the upper magnet are arranged inside a mounting base.

The lower magnet 1 and the upper magnet 5 are both a circular magnet with an outer radius of 30 mm, an inner radius of 20 mm, a height (h) of 20 mm, and a central magnetic induction intensity of 0.125 T. A curve of $$B_r \frac{\partial B_r}{\partial r} + B_z \frac{\partial B_r}{\partial z} = 0$$

(i.e., a curve of levitation position) can be obtained by calculation, which is plotted with a dotted line (the circular area corresponding to the magnets) in FIG. 1. A distance d between the upper magnet and the lower magnet is 40 mm. The lower magnet 1 and the upper magnet 5 are arranged horizontally and coaxially up and down, and a negative pole of the lower magnet 1 and a negative pole of the upper magnet 5 face each other.

Figure 2:
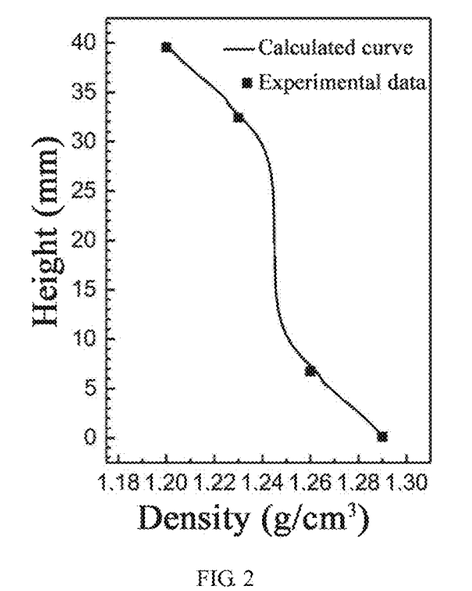
FIG. 2 is a graph showing measurement results of balls with different standard densities using a method for measuring a density based on circular magnetic levitation according to an embodiment of the present disclosure.

A density measurement is carried out based on the circular magnets with the outer radius of 30 mm, the inner radius of 20 mm, the height (h) of 20 mm, and the central magnetic induction intensity of 0.125 T. The medium solution is 2 mol/L aqueous solution of $MnCl_2$, and the samples to be measured are standard glass balls with a size of 4 mm, where the densities of these standard glass balls are respectively 1.2000, 1.2300, 1.2600 and 1.2900 g/cm$^3$. Positions where the samples can be stably levitated is shown by the dotted line between the lower magnet 1 and the upper magnet 5. Due to the symmetry of the circular magnets, the sample to be measured can stably levitate at all positions around the center axis at the corresponding height of the curve, so that a circular levitation area is formed, facilitating the density measurement. Therefore, the density of the sample to be measured can be calculated according to its levitation height to facilitate measurement, as shown in FIG. 2. In FIG. 2, the solid squares are the results of the positions of the samples with known densities placed in the above-mentioned magnetic field system, and the curve shows the results calculated by the above-mentioned formula. It can be seen from FIG. 2 that the measurement result of the method of the present disclosure is extremely consistent with the actual result.

Figure 3:
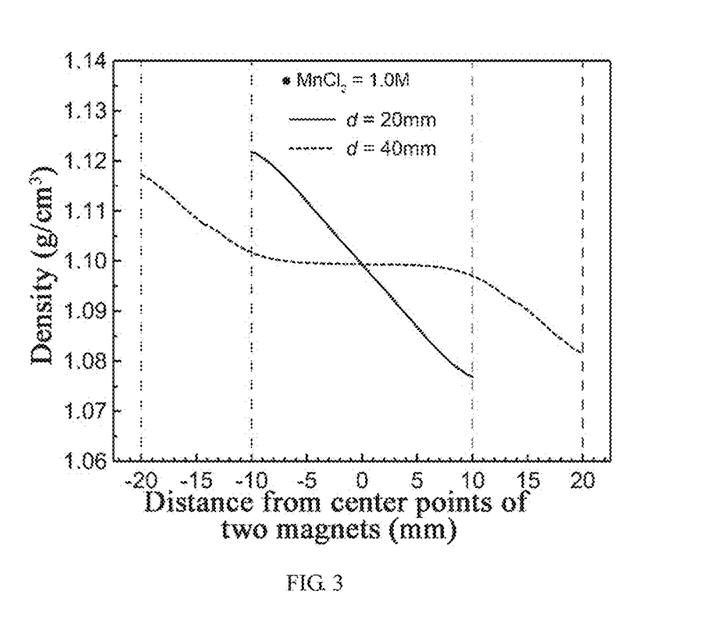
FIG. 3 shows a measurement curve of the method of the present disclosure versus a measurement curve of an existing density measurement method.

The measurement accuracy of the method of the present disclosure is much higher than that of the centerline magnetic levitation method (using the device disclosed in the embodiment of Chinese Patent Publication No. 108872007 A) under the same conditions. As shown in FIG. 3, in the same condition (each of the two circular magnets has an outer radius of 30 mm, an inner radius of 20 mm, a height (h) of 20 mm, and a central magnetic induction intensity of 0.125 T, and the medium solution is a 1.0 mol/L aqueous solution of $MnCl_2$), by comparing the measurement curves of this method (d=40 mm, circular levitation) and the existing centerline magnetic levitation measurement method (d=20 mm, central levitation), it can be seen that at the center, a slope of the curve of this method (plotted with a dashed curve) is closer to 0 than a slope of the curve of the centerline magnetic levitation measurement method (plotted with a solid curve). The slope of the curve of this method is at least 0.00003 g/cm/mm; and the slope of the curve of the centerline magnetic levitation measurement method is at least 0.00099 g/cm$^3$/mm, which indicates that this method can distinguish a smaller density difference than the existing centerline magnetic levitation measurement method in the case of the same height difference, that is, the resolution and the measurement accuracy of this method are higher than that of the existing centerline magnetic levitation measurement method.

Specifically, the present disclosure provides a method for measuring a density based on circular levitation, including the following steps.

(1) The density of the sample to be measured is estimated based on a material of the sample.

Before the experiment, the density and the magnetic susceptibility of the medium solution is calibrated in advance. Specifically, during the calibration, the medium solution is prepared with a concentration of integral moles per liter, and then the density and the magnetic susceptibility are calibrated, as shown in Table 1.

The medium solution is prepared according to the estimated density of the sample. Specifically, when preparing the medium solution, the density of the medium solution is slightly greater or slightly less than the density of the sample within an appropriate range to ensure excellent levitation of the sample to be measured.

(2) The sample to be measured is placed into the medium solution.

(3) The container containing the medium solution is placed in the magnetic levitation measurement device, i.e., the container is placed between the two circular magnets and coaxially arranged with the circular magnets.

(4) The levitation height data (levitation height) and the radial position data (levitation radius) of the sample to be measured are measured.

(5) The density of the sample to be measured is calculated according to the levitation height, the radial position data and the formula (I), where the formula (I) is as follows:

$$\rho_s = \rho_m + \frac{\chi_m - \chi_s}{g\mu_0} \left( B_r \frac{\partial B_z}{\partial r} + B_z \frac{\partial B_z}{\partial z} \right);$$

wherein $\rho_s$ is the density of the sample to be measured, g/cm³; $\rho_m$ is the density of the medium solution, g/cm³; $\chi_s$ is a magnetic susceptibility of the sample to be measured, dimensionless; $\chi_m$ is a magnetic susceptibility of the medium solution, dimensionless; g is a gravitational acceleration, m/s²; $\mu_0$ is the vacuum permeability, N/A²; $B_r$ and $B_z$ are respectively a radial magnetic field intensity and an axial magnetic field intensity at the levitation position; r,z are respectively a levitation radius and a levitation height of the sample to be measured in the medium solution, mm.

The densities and the magnetic susceptibilities of aqueous solutions of $MnCl_2$ with different concentrations are shown in Table 1.

TABLE 1

Densities and magnetic susceptibilities of aqueous solutions of $MnCl_2$ with different concentrations

| Concentration (mol/L) | Density (g/cm³) | Magnetic susceptibility |
| --- | --- | --- |
| 1 | 1.099 | $1.774 \times 10^{-4}$ |
| 1.5 | 1.148 | $2.771 \times 10^{-4}$ |
| 2 | 1.196 | $3.630 \times 10^{-4}$ |
| 2.5 | 1.244 | $4.650 \times 10^{-4}$ |
| 3 | 1.292 | $5.438 \times 10^{-4}$ |

Specifically, a density of a Polymethymethacrylate (PMMA) material (spherical particles with a diameter of 4 mm) was measured using the method of the present disclosure, in which a 2.0 mol/L aqueous solution of $MnCl_2$ was selected as the medium solution, the samples were placed in the aqueous solution of $MnCl_2$ after being cleaned with alcohol, and then placed in the measurement device. The measurement device was set aside for 3 minutes to allow the position of the samples to be stable, and the levitation position of the sample was measured with a millimeter ruler. The height is 20.4 mm, and the corresponding levitation radius is 11.3 mm. These data are substituted into the above formula (I) to obtain the density of the sample after calculation, where the obtained density is 1.1971±0.0008 g/cm³. The density measured by a density meter is 1.196±0.005 g/cm³.

This embodiment uses $MnCl_2$ solution. However, other paramagnetic solutions such as a solution of $MnC_2$, $FeCl_3$, $GdCl_3$ or Gd-DTPA can also be adopted as the medium solution of the present disclosure. Using the above method, these medium solutions can be calibrated, and the density can be measured.

Described above is a preferred embodiment of the present disclosure, and is not intended to limit the scope of the present disclosure. Any changes, equivalent modifications and improvements based on the concept of the present disclosure and uses in all other related technical fields, shall fall within the protection scope of the present disclosure.

What is claimed is:

1. A method for measuring a density based on circular magnetic levitation, comprising:
   placing a sample to be measured in a medium solution located between two circular magnets to ensure that the sample to be measured is levitated in a set circular area between the two circular magnets;
   measuring a levitation position of the sample to be measured in a magnetic field; and
   calculating the density of the sample to be measured according to formula (I):

$$\rho_s = \rho_m + \frac{\chi_m - \chi_s}{g\mu_0}\left(B_r\frac{\partial B_z}{\partial r} + B_z\frac{\partial B_z}{\partial z}\right);$$

wherein:
   $\rho_s$ is the density of the sample to be measured, g/cm³;
   $\rho_m$ is a density of the medium solution, g/cm³;
   $\chi_s$ is a magnetic susceptibility of the sample to be measured, dimensionless;
   $\chi_m$ is a magnetic susceptibility of the medium solution, dimensionless;
   g is a gravitational acceleration, m/s²;
   $\mu_0$ is a vacuum permeability, N/A²;
   $B_r$ and $B_z$ are respectively a radial magnetic field intensity and an axial magnetic field intensity at the levitation position;
   r is a levitation radius of the sample to be measured in the medium solution being a distance from a center line of the two circular magnets to the sample to be measured; and
   z is a levitation height of the sample to be measured in the medium solution being a distance from an upper surface of a lower magnet to the sample to be measured; and
   wherein a distance between the two circular magnets satisfies:
   (1) a curve expressed by a formula $$B_r\frac{\partial B_r}{\partial r} + B_z\frac{\partial B_r}{\partial z} = 0$$

does not completely coincide with a center line of the two circular magnets; and
   (2) a gradient of the curve expressed by an expression $$B_r\frac{\partial B_r}{\partial r} + B_z\frac{\partial B_r}{\partial z}$$

in r direction is greater than 0.

2. The method of claim 1, wherein the two circular magnets are arranged coaxially up and down; and like poles of the two circular magnets face each other; and the medium solution is arranged between the two circular magnets.

3. The method of claim 2, wherein an outer radius of each of the two circular magnets is 20-40 mm; an inner radius of each of the two circular magnets is 10-30 mm; a height of each of the two circular magnets is 10-30 mm; a magnetic induction intensity of each of the two circular magnets is 0.08-0.2 T; and a distance between the two circular magnets is 30-50 mm.

4. The method of claim 1, wherein the medium solution is a solution of manganese salt, iron salt, or gadolinium salt.

5. The method of claim 4, wherein the medium solution is an alcoholic solution or an aqueous solution of manganese salt, iron salt, or gadolinium salt with a concentration of 0.5-5 mol/L.

6. The method of claim 1, wherein an outer radius of each of the two circular magnets is 20-40 mm; an inner radius of each of the two circular magnets is 10-30 mm; a height of each of the two circular magnets is 10-30 mm; a magnetic induction intensity of each of the two circular magnets is 0.08-0.2 T; and a distance between the two circular magnets is 30-50 mm.

7. The method of claim 1, wherein the sample to be measured is a spherical sample, an ellipsoidal sample, an oblate sample, a disc-shaped sample, a cylindrical sample, a biconical sample, a cube-shaped sample, or a rectangular parallelepiped sample with a square cross section.

8. The method of claim 1, wherein the density of the sample to be measured is 0.8-1.5 $g/cm^3$.

9. The method of claim 1, wherein the medium solution is a 2-2.5 mol/L aqueous solution of $MnCl_2$ or a 0.8-1.5 mol/L alcohol solution of $MnCl_2$.

* * * * *